(12) United States Patent
Overton et al.

(10) Patent No.: US 7,814,169 B2
(45) Date of Patent: Oct. 12, 2010

(54) SYSTEM AND METHOD FOR ESTABLISHING AND RETRIEVING DATA BASED ON GLOBAL INDICES

(75) Inventors: John Overton, Chicago, IL (US); Michael F. Roizen, Chicago, IL (US)

(73) Assignee: Econnectix, LLC, Chicago, IL (US)

( * ) Notice: Subject to any disclaimer, the term of this patent is extended or adjusted under 35 U.S.C. 154(b) by 1095 days.

(21) Appl. No.: 10/646,350

(22) Filed: Aug. 22, 2003

(65) Prior Publication Data
US 2004/0205055 A1    Oct. 14, 2004

Related U.S. Application Data

(63) Continuation of application No. 10/102,179, filed on Mar. 19, 2002, now abandoned, which is a continuation of application No. 09/111,896, filed on Jul. 8, 1998, now abandoned, application No. 10/646,350, which is a continuation-in-part of application No. PCT/US98/00624, filed on Jan. 13, 1998.

(60) Provisional application No. 60/035,485, filed on Jan. 13, 1997.

(51) Int. Cl.
*G06F 15/16* (2006.01)
(52) U.S. Cl. ..................... 709/217; 707/782
(58) Field of Classification Search ............. None
See application file for complete search history.

(56) References Cited

U.S. PATENT DOCUMENTS

| | | | |
|---|---|---|---|
| 4,553,261 A | 11/1985 | Froessl | |
| 4,636,858 A | 1/1987 | Hague et al. | |
| 4,728,978 A | 3/1988 | Inoue et al. | |
| 4,800,488 A | 1/1989 | Agrawal et al. | |
| 4,825,406 A | 4/1989 | Bean et al. | |
| 4,835,372 A | 5/1989 | Gombrich et al. | |
| 4,914,571 A | 4/1990 | Baratz et al. | |

(Continued)

FOREIGN PATENT DOCUMENTS

EP    568 161 A1    3/1993

(Continued)

OTHER PUBLICATIONS

Callaghan V L et al., "Structures and Metrics for Image Storage and Interchange" Journal of Electronic Imaging, vol. 2, No. 2, Apr. 1, 1993, pp. 126-137.
Bourke D G et al., "Programmable Module and Circuit for Machine-Readable Unique Serial Number" IBM Technical Disclosure Bulletin, vol. 27, No. 4A, Sep. 1, 1984, pp. 1942-1944.
Kleinholz L et al., "Supporting Cooperative Medicine., The Bermed Project" IEEE Multimedia, vol. 1, No. 4, Dec. 21, 1994, pp. 44-53.

(Continued)

*Primary Examiner*—Neveen Abel Jalil
*Assistant Examiner*—Christyann R Pulliam
(74) *Attorney, Agent, or Firm*—Brinks Hofer Gilson & Lione

(57) ABSTRACT

A system and method for establishing and retrieving data based upon global indices established on the date of first use by a user. The system uses a distributed data name service (DDNS) which uniquely identifies users based upon the unique ID of devices on the system combined with the date and time of first use. Both the unique device ID and the unique user ID's are stored on servers of the system. This unique user ID generated is used for all subsequent uses of the system by the user. Searching for data generated by devices of the system relating to a particular user is accomplished by searching for instances of the user ID on servers of the system rather than by searching for the data itself. A simplified data transport protocol allows for the transfer of data from one location to another after the data is located.

12 Claims, 3 Drawing Sheets

U.S. PATENT DOCUMENTS

| | | | |
|---|---|---|---|
| 5,008,700 A | | 4/1991 | Okamoto |
| 5,124,814 A | | 6/1992 | Takahashi et al. |
| 5,193,185 A | | 3/1993 | Lanter |
| 5,208,623 A | | 5/1993 | Takahashi |
| 5,276,735 A | * | 1/1994 | Boebert et al. .............. 713/167 |
| 5,291,399 A | | 3/1994 | Chaco |
| 5,319,401 A | | 6/1994 | Hicks |
| 5,345,586 A | * | 9/1994 | Hamala et al. ................ 707/10 |
| 5,347,600 A | | 9/1994 | Barnsley et al. |
| 5,384,643 A | | 1/1995 | Inga et al. |
| 5,414,841 A | | 5/1995 | Bingham et al. |
| 5,454,101 A | | 9/1995 | Mackay et al. .............. 395/600 |
| 5,455,648 A | | 10/1995 | Kazami |
| 5,475,817 A | | 12/1995 | Waldo et al. |
| 5,479,654 A | | 12/1995 | Squibb |
| 5,491,511 A | | 2/1996 | Odle .......................... 348/153 |
| 5,499,113 A | | 3/1996 | Tsuboi et al. |
| 5,522,077 A | | 5/1996 | Cuthbert et al. |
| 5,537,547 A | | 7/1996 | Chan et al. |
| 5,550,981 A | | 8/1996 | Bauer et al. |
| 5,551,027 A | | 8/1996 | Choy et al. |
| 5,557,790 A | | 9/1996 | Bingham et al. |
| 5,560,005 A | | 9/1996 | Hoover et al. |
| 5,576,952 A | | 11/1996 | Stutman et al. |
| 5,579,067 A | | 11/1996 | Wakabayashi |
| 5,610,653 A | | 3/1997 | Abecassis |
| 5,617,570 A | | 4/1997 | Russell et al. |
| 5,625,841 A | | 4/1997 | Dawkins et al. |
| 5,649,247 A | | 7/1997 | Itoh et al. |
| 5,664,170 A | | 9/1997 | Taylor |
| 5,669,029 A | | 9/1997 | Fyson et al. |
| 5,724,575 A | * | 3/1998 | Hoover et al. ................. 707/10 |
| 5,740,428 A | | 4/1998 | Mortimore et al. |
| 5,764,889 A | | 6/1998 | Ault et al. |
| 5,764,906 A | | 6/1998 | Edelstein et al. |
| 5,774,670 A | | 6/1998 | Montulli |
| 5,781,725 A | | 7/1998 | Saito |
| 5,784,565 A | | 7/1998 | Lewine |
| 5,802,518 A | | 9/1998 | Karaev et al. |
| 5,809,161 A | | 9/1998 | Auty et al. |
| 5,809,331 A | | 9/1998 | Staats et al. |
| 5,809,495 A | | 9/1998 | Loaiza |
| 5,813,006 A | | 9/1998 | Polnerow et al. |
| 5,832,487 A | | 11/1998 | Olds et al. .................... 707/10 |
| 5,848,246 A | | 12/1998 | Gish |
| 5,864,482 A | | 1/1999 | Hazama et al. |
| 5,872,973 A | | 2/1999 | Mitchell et al. |
| 5,875,302 A | | 2/1999 | Obhan |
| 5,903,889 A | | 5/1999 | de la Huerga et al. |
| 5,907,837 A | | 5/1999 | Ferrel et al. |
| 5,913,210 A | | 6/1999 | Call |
| 5,915,240 A | | 6/1999 | Karpf |
| 5,918,214 A | | 6/1999 | Perkowski |
| 5,920,702 A | | 7/1999 | Bleidt et al. |
| 5,940,844 A | * | 8/1999 | Cahill et al. ................. 715/526 |
| 5,950,173 A | | 9/1999 | Perkowski |
| 5,961,610 A | | 10/1999 | Kelly et al. |
| 5,966,705 A | | 10/1999 | Koneru et al. |
| 5,974,124 A | | 10/1999 | Schlueter, Jr. et al. |
| 5,974,409 A | | 10/1999 | Sanu et al. |
| 5,978,773 A | | 11/1999 | Hudetz et al. |
| 5,987,519 A | | 11/1999 | Peifer et al. |
| 5,995,965 A | * | 11/1999 | Experton ..................... 707/10 |
| 6,032,175 A | | 2/2000 | Fletcher et al. |
| 6,047,332 A | | 4/2000 | Viswanathan et al. |
| 6,055,544 A | | 4/2000 | DeRose et al. |
| 6,058,193 A | | 5/2000 | Cordery et al. |
| 6,070,191 A | | 5/2000 | Narendran et al. .......... 709/226 |
| 6,092,189 A | | 7/2000 | Fisher et al. |
| 6,108,787 A | | 8/2000 | Anderson et al. |
| 6,131,095 A | | 10/2000 | Low et al. |
| 6,154,738 A | | 11/2000 | Call |
| 6,167,438 A | * | 12/2000 | Yates et al. .................. 709/216 |
| 6,188,766 B1 | | 2/2001 | Kocher |
| 6,201,931 B1 | | 3/2001 | Cipolla et al. |
| 6,202,070 B1 | | 3/2001 | Nguyen et al. |
| 6,209,095 B1 | | 3/2001 | Anderson et al. |
| 6,212,280 B1 | | 4/2001 | Howard, Jr. et al. |
| 6,370,584 B1 | | 4/2002 | Bestavros et al. ........... 709/238 |
| 6,374,253 B1 | * | 4/2002 | Weider et al. ............... 707/102 |
| 6,377,986 B1 | | 4/2002 | Philyaw et al. |
| 6,418,441 B1 | | 7/2002 | Call |
| 6,438,652 B1 | | 8/2002 | Jordan et al. |
| 6,453,404 B1 | | 9/2002 | Bereznyi et al. ............. 711/171 |
| 6,463,454 B1 | | 10/2002 | Lumelsky et al. |
| 6,466,980 B1 | | 10/2002 | Lumelsky et al. |
| 6,470,389 B1 | | 10/2002 | Chung et al. ................. 709/227 |
| 6,578,068 B1 | | 6/2003 | Bowman-Amuah |
| 6,594,253 B1 | | 7/2003 | Sallberg et al. .............. 370/349 |
| 6,711,408 B1 | | 3/2004 | Raith |
| 7,103,640 B1 | | 9/2006 | Overton et al. |
| 7,233,978 B2 | * | 6/2007 | Overton et al. .............. 709/217 |
| 7,272,625 B1 | | 9/2007 | Hannel et al. ................ 709/200 |
| 7,349,902 B1 | | 3/2008 | Arlitt et al. ..................... 707/8 |
| 7,634,453 B1 | | 12/2009 | Bakke et al. .................... 707/1 |
| 2001/0013059 A1 | | 8/2001 | Dawson et al. .............. 709/217 |
| 2002/0032787 A1 | | 3/2002 | Overton et al. |
| 2002/0112048 A1 | | 8/2002 | Gruyer et al. |
| 2003/0065653 A1 | | 4/2003 | Overton et al. .................. 707/3 |
| 2004/0205055 A1 | | 10/2004 | Overton et al. .................. 707/3 |
| 2007/0011267 A1 | | 1/2007 | Overton et al. .............. 709/217 |
| 2008/0005275 A1 | | 1/2008 | Overton et al. .............. 709/218 |

FOREIGN PATENT DOCUMENTS

| | | |
|---|---|---|
| EP | 0 889 422 A2 | 1/1999 |
| EP | 0 919 912 A2 | 6/1999 |
| WO | WO 86/05610 | 9/1986 |
| WO | WO 98/00624 | 1/1998 |
| WO | WO 98/15910 | 4/1998 |
| WO | WO 98/31138 | 7/1998 |
| WO | WO 00/03526 | 1/2000 |

OTHER PUBLICATIONS

"Method for Network Naming and Routing" IBM Technical Disclosure Bulletin, vol. 37, No. 9, Sep. 1, 1994, p. 255.

"Minimizing Locking to Access Global Shared Data", IBM Technical Disclosure Bulletin, Feb. 1995, pp. 619-622.

"Service Location in an Open Distributed Environment," Beitz et al., Second International Workshop on Services in Distributed and Networked Environments, IEEE Comput. Soc., Jun. 1995, pp. 28-34.

Muniz, R., et al., "A robust software barcode reader using the Hough transform", Abstract from IEEE/IEE Electronic Library online, printed Apr. 30, 2001, 2 pages.

Fresonke, D., "In-fab identification of silicon wafers with clean, laser marked barcodes", Abstract from IEEE/IEE Electronic Library online, printed Apr. 30, 2001, 2 pages.

Sriram, T., et al., "Applications of barcode technology in automated storage and retrieval systems", Abstract from IEEE/IEE Electronic Library online, printed Apr. 30, 2001, 2 pages.

Baer, Tony, "Tales from the Network", Computerworld Healthcare Journal, www.computerworld.com/news/1996/story/0,11280, 14557,00.html, pp. 1-9, Oct. 1, 1996.

Communication relating to the results of the Partial International Search Report for PCT Application No. PCT/US01/18013 dated Apr. 15, 2002.

U.S. Appl. No. 09/111,896, filed Jul. 8, 1998, Overton et al.

Notice of Allowance, dated Jun. 25, 2010, pp. 1-8, U.S. Appl. No. 11/354,224, U.S. Patent and Trademark Office, Virginia.

Office Action, dated Mar. 30, 2010, pp. 1-12, U.S. Appl. No. 11/803,332, U.S. Patent and Trademark Office, Virginia.

\* cited by examiner

SYSTEM AND METHOD FOR ESTABLISHING AND RETRIEVING DATA BASED ON GLOBAL INDICES

This application is a continuation of application Ser. No. 10/102,179, filed Mar. 19, 2002 now abandoned, which is a continuation of application Ser. No. 09/111,896, filed Jul. 8, 1998 now abandoned, both of which are hereby incorporated by reference. This application is also a continuation-in-part of PCT Application Serial No. US98/00624, entitled Automated Image Archiving System, filed Jan. 13, 1998; and U.S. Provisional Patent Application Ser. No. 60/035,485, entitled Automated Image Archiving System, filed Jan. 13, 1997.

FIELD OF THE INVENTION

This invention relates generally to storage to data and retrieval of records. More particularly this invention relates to a universal method for generating an index of medical records at the time services are rendered and retrieving medical records based upon the automated indexing performed.

BACKGROUND OF THE INVENTION

Medical records can reside in many different places. As a patient sees different doctors and is treated for different conditions, individual records relating to the patient are created in each individual location. Therefore a medical record could exist at a general practitioner where the patient goes for annual physicals. At another time a medical record could be created for the patient at an immediate care facility where emergency room services are rendered. In a similar fashion a medical record for the same patient could be created at a particular specialist's office who treats the patient for a particular condition. All of these medical records may be critical to the treatment of the patient in any particular circumstance. If the total medical record for individual patient is not available, certain diagnoses may be overlooked or erroneously made.

Several systems have addressed the issue of how to create universal medical records. In general these systems create medical records by the creation of a file in some central storage area. Thereafter the central storage area may be accessed by individual practitioners by accessing the central storage of the medical record. Such systems use a "root registration" system wherein medical records and identities are registered centrally. Such systems generally are not fully automated leading to the potential for errors. Further only "registered" records awe available to remote users. Thus if a patient's medical record is not centrally registered, it is simply not available to the practitioner.

Another disadvantage of the central registration process is that, at the present time, no single format is universal. Thus many different medical organizations have different formats which cannot be accessed among different medical institutions. Even if such access is granted, format translation programs must be used which could cause additional errors in translation.

One example of a system which attempts to obtain a master index of patient identification information is the telemed system in use at Los Alamos labs. That system maintains a master index of patient IDs thus tracking patient ID as a master reference. The master ID is then used to determine where to find data related to a particular patient. Telemed system deals with topological information normally characterizing patient records. Further, the system relies upon "middleware" to resolve differences between database systems that possess a particular patient's record. Thus a translation mechanism is necessary. Further, the telemed system still requires a master patient index as a form of central registration.

In contrast to the systems noted above, the present invention does not rely on a root registration or a central registration of client information. Rather, the present invention establishes an identity for a patient at the time of service, based on the identity of a given device. This identity is established at the location of the device and not at any central location. This identity is designated, however, in a universal fashion such that, for patient's whose identity is established by the system, information relating to that particular patient can be looked up in a convenient manner. Further, the present invention comprises the data transfer protocol to allow for global addressing and retrieval of information from sites remote from the location at which the patient is present. In this matter, all information concerning a particular patient maybe retrieved by the location treating the patient.

BRIEF DESCRIPTION OF THE INVENTION

It is therefore and objective of the present invention to be able to locate information by searching for indices of that information rather than for the information itself.

It is a further objective of the present invention to establish device driven unique identifiers that identify a person using the system.

It is a further objective of the present invention to establish device driven unique identifiers that identify a objects that are the subject of transactions using the system.

It is yet another objective of the present information to establish a global identifier for a user of the present invention the first time that a user uses the present invention.

It is yet another objective of the present information to establish a persistent identifier for a user of the present invention the first time that a user uses the present invention.

It is a further objective of the present invention to uniquely identify a particular device connected to the system.

It is yet another objective of the present invention to establish device identification the first time that a device is activated on the system.

It is a further objective of the present invention to make data universally available as soon as that data is created on the system.

It is another objective of the present invention to make data available at sites remote from the location at which the data is created as soon as the data is created.

It is yet another objective of the present invention to be able to search for data of interest without knowledge of the format in which the data was originally created.

It is a further objective of the present invention to allow local sites where data is created to establish their own formatting and storage policies without such formatting and storage polices being dictated by a central facility.

It is yet another objective of the present invention to establish security for a users records by separating the user records from the identification card issues to a user.

The present invention uses a device-based paradigm to avoid the confusion and restrictions associated with root registration systems. For example, a particular manufacturer would register its company for participation with the present invention. Identification numbers are assigned by the manufacturer and used to designate the equipment in question. Thus equipment from a particular manufacturer which is used by a particular practitioner or health care provider has a unique ID. A date/time stamp is also added to this equipment ID to designate the source and when the equipment is used.

The present invention also comprises a simple network transport up protocol, defined in this application as the Simple Data Transfer Protocol or SDTP. The SDTP provides Internet wide sharing of data and database systems through a client/server, transaction based model of data interaction and management. The SDTP allows for the transmission, reception, and recovery of data from disparate locations.

The present invention also provides a network delivery mechanism for addressing where to find requested information. This subsystem known as the distributed data name service or DDNS is the reference system by which SDTP operates. This is not meant however as a limitation. Once the location of information is established by the DDNS, retrieval of information could occur equally as well by any protocol once that protocol knows the location of the desired information.

Various universal encoding systems are also used in the present invention so that individual devices and users of those devices can be encoded in a universal fashion.

It should be noted that the preferred embodiment illustrated in this specification is that of a medical device and data retrieval system. However, the present invention should not be construed as being so limited. For example the architectures and topology of the present invention is equally well suited to commercial transactions such as point of sale transactions, the generation of ATM cards and other commercial ventures. It can also be sued as a form of identification for employees of large organizations where security and access to facilities in disparate locations must be tightly controlled. Thus while the medical application will be elucidated below, those skilled in the art will appreciate that the system and method described can be applied in many disparate situations.

Using the present invention, device manufacturers register their own unique names with the system. For example Hewlett-Packard may register the name "HP" to be used with all of its device ID numbers whereas another manufacturer such as Phillips might register another different name "PPH." When a medical device is first used on the system, its own identification (manufacturer, and device ID number) is automatically registered with the system. A patient receives an ID number, the first time the patient receives an ECG or is x-rayed by equipment that is registered with the system of the present invention. Thus the first time a patient is examined via medical equipment of the present invention, a universal record of not only the equipment, but also the patient is automatically created.

The present invention also comprises a user identification token or barcode label placed on any card of any variety which may be in the form of a credit card, smart card or other token card which is generated at the time of the first use of any device registered with the system. From that point on, the patient identification card is "registered" within the system. Further, the health care provider simply uses the imaging equipment available based upon the patient identification card, the universal encoding of the system, and images recorded with appropriate patient identification information and image information. In addition, the image created is universally available immediately after creation.

After recording information, the present invention tracks indices to locations of information. If the location of the device changes, that information could be tracked by the DDNS level 1 server so that queries could be automatically rerouted to the location at which the device is currently housed. Thus the information can change as necessary while the index to access that information does not. The present invention also does not require standardized formatting of information. Thus, local sites format and store their own information as they desire without having to adhere to a particular dictated format. Thus local sites do not have equipment, staffing, administration, and other matters imposed upon them.

The system of the present invention transports, sends, delivers, receives, and processes information objects. No middleware is required. Transmission of request for information and the receiving of that information is done, using the simplified data transfer protocol. In addition, existing systems can be included within the present invention since any kind of document or object can fit within the present invention as an object. Only namespaces as addresses are necessary for the present invention in order to find the location of desired information and retrieve that information.

In summary, the present invention is a device driven addressing system rather than a top-down addressing system. Individual devices create the namespace address necessary to retrieve information created by the individual device. Thus the present invention allows the minimal set of possible information at the top-level, which is used for routing requests for information, with actual information created by individual devices or sites stored and located at those devices or sites.

The present invention comprises a Simple Data Transport Protocol (SDTP), Distributed Data Name Service (DDNS) software implementation, and a paradigm for automated indexing of global databases.

The DDNS design is similar in function to the domain name service which supports all Internet addresses. The domain name service for the Internet allows a single address to be used by any user regardless of that user's location to find another user on the Internet. In a similar fashion the DDNS of the present invention supports such a lookup service. However DDNS is generalized and optimized for resolving database locations and database service locations.

The DDNS exists in a series of servers in a tree structure whereby medical diagnostic equipment are connected to servers. These lower level servers are in turn connected to higher level servers in a tree structure or parent-child relationship. There is no practical limit to the level of servers in the tree structure. It is only required that there be sufficient levels of servers to satisfy the query needs of the organizations connected to the DDNS network.

Using the DDNS of the present invention, if a client machine requires information it does not have, it sends a query to a parent server concerning where to find the record information. In this application, the parent server is referred to as a DDNS Level 2 server or DDNS-2 server. This situation can exist in the medical sense if a patient, having a medical ID card of the present invention, visits an emergency room in other than the patient's home city. In that situation the patient may use the patient ID card which will not be recognized by the local medical diagnostic equipment. In that case the medical diagnostic equipment will query the next higher server regarding where to find information on the patient.

If the server being queried has the necessary information, and answers the requesting client, the Interaction stops. If the server does not have the information, it in turn, asks its parent server, and so on up a tree structure of parent-child DDNS servers until the requested information is found. Once the patient index information is found, it is passed back down to the originating client which receives address/index information for a direct site to site request. At this point a peer-to-peer connection can be made whereby the client receives the desired medical information directly from the medical diagnostic equipment or database possessing that information.

The Simplified Data Transport Protocol (SDTP)

Once the source of the desired information is located it becomes necessary to transfer the desired information from one location to another. The Simplified Data Transport Protocol (SDTP) of the present invention has this task. SDTP provides Internet-wide sharing of data and database systems through a client-server, transaction-based model of data interaction and management. SDTP structures transmission, reception, and recovery of data.

DETAILED DESCRIPTION OF THE PREFERRED EMBODIMENT

As noted earlier, the present invention comprises a Distributed Domain Name Service (DDNS) software implementation whereby devices and users are uniquely identified and registered on servers of the system the first time the devices are used and the first time that users use the devices, a Simple Data Transport Protocol (SDTP) whereby once data of interest is located, that data can be transported from location to location with ease, and a paradigm for automated indexing of global databases.

Distributed Data Name Service (DDNS)

Distributed Data Name Service (DDNS) provides a name lookup service for the indexing of global databases. It is designed to work in between a transfer protocol such as SDTP, and an encoding scheme for naming objects uniquely.

Figure 1:
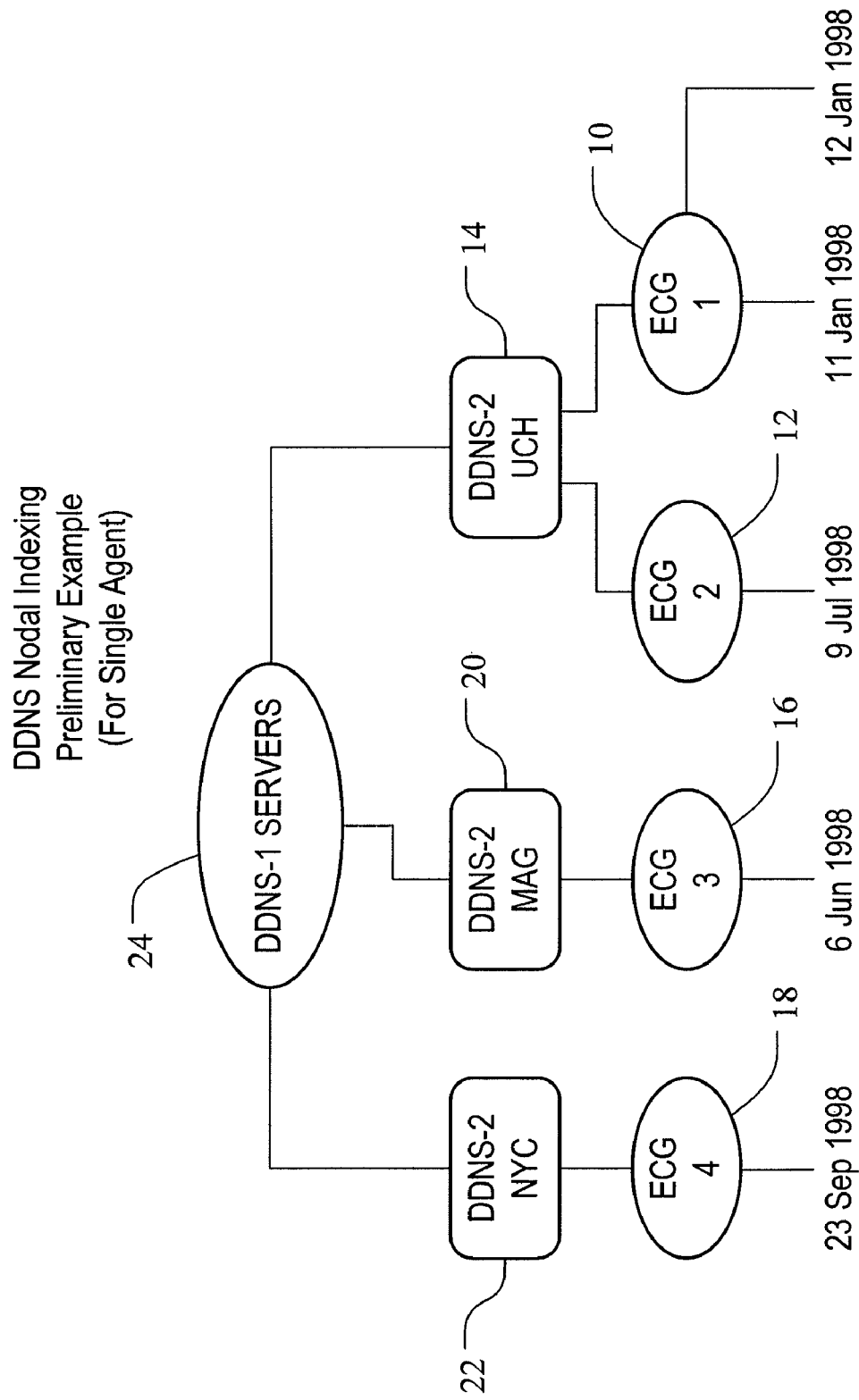
FIG. 1 illustrates the DDNS server nodes

The DDNS implementation is similar to DNS (Domain Name Service), which supports all Internet name lookup service. The basic idea is illustrated in FIG. 1 DDNS Nodal Indexing.

In DDNS, if a client machine needs information it does not have, it asks a parent server where to find that information. If that server has the information, it answers the requesting client and the interaction stops. If the server does not have the information, it in turn asks its parent server, and so on, up a tree structure of parent-child DDNS machines, until the requested information is found. Once the information is found, it is passed back down to the originating client, which receives forwarding information for a direct site-tosite request, at which point a peer-to-peer connection is made "horizontally" in the tree structure.

It is important to note that, strictly speaking, DDNS is not "Middleware". Although it can appropriately interact with Middleware as necessary.

DDNS provides efficient recovery of records from anywhere on a network, and has no machine-type or operating system restrictions whatsoever. Its architecture provides intrinsic scalability suitable for supporting universal databases that may require diskspace exceeding current technologies for individual sites. Since it resolves names paces rather than IP addresses, DDNS will seamlessly migrate to new network protocols such as "IP2" whenever traditional IP is replaced. Using names paces also supports organizational durability, since organizations may change names and have these reticulated through the DDNS structure, or keep the same names and change the undergirding machine hardware supporting those names without impact of data accessibility to the network.

The SDTP/DDNS combination provides an automatic, low-level addressing and retrieval mechanism on which other functionality can be conveniently built. Such functionality may include automatic invoicing automatically generated statistical polling of part quality, demographic information for illnesses without access to patient identity, etc. Such functionality supports electronic interaction and electronic commerce.

Used with SDTP and other naming and classification conventions, DDNS can provide global indexing of any kind of image, produced on any kind of image-producing device, making any image retrievable by a click of a barcode reader. Yet images may be produced on different machines in different countries. Implications of such design specifically include SDTP/DDNS/ASIA support for universal image recall through standard medical cards given to patients at local hospitals. This is discussed specifically elsewhere in the documents Used with other encoding schemes, SDTP/DDNS functionality may conveniently extend into diverse applications. Such applications may include automated part tracking, automated consumer purchase and repurchase, automated manufacturer-retailer profit distribution, and automated assessments of production quality on a plant-by-plant basis.

The major advantages supporting DDNS design include:
1. Machine interactions are name lookups, not actual data transfers, until the very last moment when a site-to-site connection can be made. Thus, interactions are very fast between machines.
2. Information contained on any machine emphasizes minimalist storage. A machine attempts to keep only the most minimal information it needs on its local system, knowing that it can retrieve remote information very quickly whenever needed.
3. Storage of data is genuine distributed. Since DDNS servers only hold index information for where to get information, rather than the information itself, global databases can be unlimited in size. Even very large global databases that exceed the physical storage possibilities of single sites will have excellent performance.

To illustrate the benefits, consider an example in which local sites cannot usefully store more than 50 terabytes of information. Since a global database supported by SDTP/DDNS only stores addressing information, it can provide information on many such sites, letting those sites resolve the actual data internally.
4. Each machine may cache its previous lookups and thus avoiding vertical lookups for recurrently used data. For data that sister sites will share over and over the caching mechanism allows site-to-site connections without making parent-node queries. Thus, performance is very fast, even when scaling to very large addressing mechanisms.
5. Local policies determine disk storage and internal data structure for local systems. Yet local information will be available globally.

Flexibility & Ease of Use

Flexibility, generality, and ubiquitous accessibility are core principles of the SDTP/DDNS implementation. With a minimal "backbone" infrastructure of a small collection of machines, DDNS can support numerous concurrent universal databases, conveniently supporting as diverse systems as automated parts tracking in automobile repairs, insurance records, and purchase and repurchase of any scanable item: clothing, home appliances, wood, paint, groceries, etc. Such applications will only require a barcode click on behalf of the user. And then on behalf of that user, a computer queries a DDNS server for data location, and then SDTP retrieves the data from the appropriate site.

Simple Data Transport Protocol (SDTP)

The following terminology and associated definitions are used in this specification:

Database: A collection of records. SDTP supported databases can be local and/or global.

Record: A denotatum stored in a database.

Transaction: An interaction between a client query and server response. Example transactions include modifying a global database and finding a record in a database.

Client Query: A request from a client sent to a server.

Server Response: A response from a server sent to a client.

Message: Generally, a client query or server response. Specifically, a content identifier and data object.

Content Identifier: The first string of a SDTP message that identifies SDTP/0.9 version, command, and arguments to process.

Data Object: A header and body. Data objects may include text, images, video, sound, etc.

Header: Header information in a data object, employing MIME conventions.

Body: Body information in a data object, employing MIME conventions.

The Simple Data Transport Protocol (SDTP) of the present invention is a protocol that applies to dynamically distributed, Internet-wide, database systems.

The SDTP protocol provides universal addressing of database systems, and universal search and retrieval of data stored on such systems. SDTP supports any encoding mechanism, but is optimized for large scale or universal encoding mechanisms for universal image tracking.

SDTP distributed database functionality can seamlessly traverse any network topology, machine-type, operating system, database system, etc. The protocol supports all forms of data: text, image, video, sound, etc.

SDTP permits intelligent, efficient, fully automated data-sharing on a site-to-site, device-by-device basis, searching and retrieving specific data sets. Data sets can be located anywhere on a network, and have no physical storage-size restrictions. Searching can be local or global. For example, data produced by an ECG machine in Chicago is available to another ECG machine in Bangkok.

In SDTP data are no longer viewed as existing on a single system, or any collection of explicitly linked systems or sub-systems, such as credit card authorization systems. Rather, SDTP views data as query relations, in which a single, very simple query mechanism dynamically organizes and retrieves germane information at a moment of request.

The basic mechanism works such that when a client query is fully satisfied locally, a search can halt. When a client query is not satisfied locally, within a couple of network "hops" a SDTP server response will return a comprehensive list of data locations to the requesting client. A given client needs no initial knowledge that related data even exist, or where or how such data are stored. Yet for any given record, a client query can rapidly find all related records across the Internet-even if related records exist on databases unknown to exist by the requesting client, at the moment of its request.

SDTP can support machine clusters, LANs, WANs, heterogeneous networks, collections of linked networks, or any set of these. This design explicitly includes support for full, Internet-wide search and retrieval of records. Essentially, there are no network restrictions for SDTP; it can transport and retrieve information for local or global systems alike.

SDTP operations rely on client-server transactions. A transaction is characterized by a client sending a message to a server, and the server sending back a message to the client. SDTP/0.9 supports two basic transactions, Lookup and Modify, each of which has two commands. Table 2 summarizes these relations.

TABLE 2

| Transactions | | |
|---|---|---|
| Lookup | index | Retrieve a record's index, but not the record itself |
| | query | Retrieve a record. |
| Modify | ADD | Add a record to a database. |
| | DELETE | Remove a record from a database. |

Since SDTP applies to any kind of database, existing anywhere on the Internet, SDTP transactions provide genuinely global searching, retrieving, adding, and removing records from universal databases.

As noted earlier, a message is a client query or a server response. The data structure of messages consists in a content identifier and data object. Table 3 summarizes these relations. A content identifier identifies SDTP version, command, and any arguments. A data object

TABLE 3

| Message Data Structure | |
|---|---|
| Content Identifier | |
| Data Object | Header |
| | Body | consists in a header and body, both of which support MIME conventions. A healer contains information about the transaction-type and data specifications. A body contains data, which can include MIME multipart documents, among other data.

SDTP relies on uniform interaction between clients and servers, transacted through client query and server response messages. A client query requests actions from a server. A server response answers client queries and sometimes also performs actions on behalf of the client called server actions. Both client queries and server responses rely on the data structure of messages.

Table 4 summarizes protocol relations. Since transactions are interactions between client queries and server responses, a 'lookup index' transaction would involve an exchange between a client query and a server response. In turn, client queries and server responses are subject to content identifiers and data objects.

TABLE 4

| Protocol Relations | | |
|---|---|---|
| Transactions | Lookup | index |
| | | query |
| | Modify | ADD |
| | | DELETE |

TABLE 4-continued

Protocol Relations

| Client Query | Content Identifier | |
| --- | --- | --- |
| | Data Object | Header |
| | | Body |
| Server Response | Content Identifier | |
| | Data Object | Header |
| | | Body |

Message Data Structure

A message is a content identifier and a data object. The SDTP client query content identifier syntax is:

SDTP/version command argument . . .

These expansions describe content identifier semantics:

| version | SDTP version number. |
| --- | --- |
| command | Keyword specifying SDTP activity. |
| argument | Argument for command. |
| . . . | Subsequent arguments. |

Example. Consider this legal content identifier:

SDTP/0.9 LOOKUP MedImages 123.abc

Following the content identifier syntax, the command is 'LOOKUP' with two arguments: (1)'MedImages' (the database to search) and (2) '123. abc' (a record or set of records as might occur in a hospital system).

A data object includes (1) a header and (2) a body. A data object may include text, images, video, sound, any other media or data type, and any combination thereof.

A header consists in one or more lines and is terminated by a blank line. The syntax for such lines is:

fieldname: data

The argument data may have any number of additional arguments separated by semicolons (';'). These expansions describe the header semantics:

| fieldname | Label for data field | (e.g., Date, Content-Length, Content-Type, etc.) |
| --- | --- | --- |
| data | Data | (e.g., for content-type, cookies etc.) |

Client query data object headers additionally can contain preferences for server responses, but SDTP/0.9 does not yet specify these.

For example, consider the following data object header. This example illustrates a Lookup transaction that retrieves a record:

Content-Type: application/sdtp; transaction="lookup-1"; lookuptype="query"

A body consists in a MIME body, including multipart bodies [FB96a]. This structure facilitates transmission of all data types such as text, graphics, sound, video, etc.

A body contains content or is null. The exact format of the body depends upon specific databases, and thus is fixed in a separate standardization process not subject to SDTP.

For example, consider the following data object body. This example indicates a successful deletion of record '123.abc':

SUCCEEDED DELETE 123.abc

A client query is a message, and consists in (1) a content identifier and (2) a data object.

An example of a client query data object is:

Content-Type: application/sdtp; transaction="modification"
From: medical.cenon.com
DELETE 123.abc
ADD DEF0456

A server response is a message, and consists in (1) always a data object, and (2) sometimes an additional server action (e.g., a record deletion). See also Message Data Structure.

Unlike client queries, SDTP server responses have no content identifier. Server responses are data objects.

Server response data object headers are transaction types.

For example, consider the following server response data object header. The Transaction type illustrates address forwarding.

Content-Type: application/sdtp; transaction="forwarding"

The Server response data object body syntax is determined in the data object header according to the transaction specification. A body contains content or is null. For example, consider the following server response data object body which illustrates successful deletion of record '123. abc', and failed addition of record 'DEF@456'.

SUCCEEDED DELETE 123.abc
FAILED ADD DF.FO456

Example Server Response Data Object

Consider this example of a server response data object, including both header and body:

Content-Type: application/sdtp; transaction="modification"
From: medical.cenon.com
SUCCEEDED DELETE 123.abc
FAILED ADD DEF@456

A server response may invoke a server action, such as adding or deleting a record from a database. SDTP specifies the structure and syntax of data objects. SDTP specifies a semantics associated with the server action, but not structure or detail of implementation. Such considerations axe left to decisions of site-by-site implementation.

Transactions

A transaction consists of (1) a client query (to server), and (2) a server response (to client). The current version, SDTP 0.9, provides two types of transactions, Lookup and Modify. Table 5 illustrates these relations.

TABLE 5

Transaction Summary

| | Client Query | Server Response |
| --- | --- | --- |
| Lookup | Client queries server for records. | Server returns records, or location instructions for where to find records. |
| Modify | Client requests server synchronization | Server synchronizes data storage. |

Lookup: A Lookup transaction determines if a node has knowledge of requested record(s).

Client Query: A Lookup client query is a message, and thus contains (1) a content identifier and (2) a data object.

(1) Content Identifier: An sample Lookup content identifieris as follows:

SDTP/0.9 MODIFY MedImages 123.abc (2) Data Object: A Modify data object will contain (A) a header and (B) a body.

(2A) Header: The Lookup header uses a Content-Type that specifies (1) a Lookup transaction and (2) a lookuptype. A Lookup data object header has syntax:

Content-type: application/sdtp; transaction="lookup"; lookuptype="type" 'type' in 'lookuptype' has these values and meanings in SDTP/0.9:

Value Meaning
query Transfer a record
index Transfer a record's index, but not the record itself The following example of a Content-Type data object header retrieves a record's index, but not the record itself:

Content-Type: application/sdtp; transaction="lookup"; lookuptype="index"

(2B) Body: A Lookup client query data object body is empty in SDTP/0.9.

Server Response: A Lookup response (1) has no content identifier, and (2) has a data object.

(1) Content Identifier: The Lookup server response has no content identifier.

(2) Data Object: The Lookup server response data object has (A) a header and (B) a body.

(2A) Header: This header specifies the Content-Type of the server response, but may also include other information such as MD5 encrypted signatures, etc.

(2B) Body: The body follows MIME message body conventions [FB96a]. SDTP data object bodies have three forms:

1. One or more records, structured as MIME multipart documents [FB96a].

2. Forwarding instructions, for one or more records, structured as the MIME type application/sdtp with attribute transaction set to forwarding. For example:

Content-Type: application/sdtp; transaction="forwarding"

A following data object body would contain a list of addresses to query for records.

3. Compound responses, structured as MIME multipart documents. Each part of a multipart document will be:

(a) Form 1, One or more records (b) Form 2, Forwarding instructions (c) Form 3, Compound responses.

Example Lookup Transaction: This example illustrates a Lookup transaction, in which record '123.abc' is retrieved from universal database 'MedImages'. The transaction consists in a client query and a server response.

Client Query: The following 3 line transcript is a plausible client query Lookup record retrieval request, from medical.cenon.com.

SDTP/0.9 LOOKUP MedImages 123.abc
Content-Type: application/sdtp; transaction="lookup"; lookuptype="query"
From: medical.cenon.com This query requests the retrieval of record '123.abc' from universal database 'MedImages'. Server Response: The following 7 line server response indicates a plausible server reply to the previous client query.

SDTP/0.9 LOOKUP MedImages
Content-Type: application/sdtp; transaction="forwarding"
From: medical.cenon.com
ddns-2.uch.net
ddns-2.mag.net
ddns-2.nyc.net The server forwards the client addresses where questions are answered about record '123.abc' in universal database 'MedImages'.

Modify: A Modify transaction synchronizes databases. A client query asks for modification of server-stored data, such as adding or deleting a record.

Client Query: A Modify client query includes (1) a content identifier and (2) a data object.

(1) Content Identifier

See Content Identifier about content identifier syntax and semantics. An example Modify content identifier looks like:

SDTP/0.9 MODIFY MedImages 123.abc (2) Data Object

See Data Object about data object syntax and semantics. A Modify data object will contain (A) a header and (B) a body.

(2A) Header. A Modify data object header specifies a Content-Type using transaction="modification". An example looks like:

Content-Type: application/sdtp; transaction="modification"

(2B) Body. The Modify data object body contains instructions detailing modification of the data base, such as adding and deleting records. An example data object body request for deleting record '123.abc' and adding record 'DEF@456' could be:

DELETE 123.abc
ADD DEF@456

Server Response

A Modify server response (1) has no content identifier, and (2) has a data object.

(1) Content Identifier The Modify server response has no content identifier.

(2) Data Object

See Data Object about data object syntax and semantics. The Lookup server response data object has (A) a header and (B) a body.

(2A) Header. This header specifies the Content-Type of the server response, but may also include other information such as MD5 encrypted signatures, etc.

(2B) Body. The body follows MIME message body conventions [FB96a]. The Modify data object body may also contain verification information, such as the success or failure of a request. Verification information often is null.

Example Modify Transaction

The following example illustrates a Modify transaction. This example modifies the universal MedImages database, where the client query requests to delete record 123.abc and to add record DEF@456. The transaction consists in a client query and a server response.

Client Query. The following 6 line transcript requests to delete and add a record from database MedImages.

SDTP/0.9 MODIFY MedImages
Content-Type: application/sdtp; transaction="modification"
From: medical.cenon.com
DELETE 123.abc
ADD DEF@456

Line 1. Client query identifies protocol and requests modification of database MedImages.

Line 2. 'Content-Type' identifies a SDTP application; 'transaction' specifies a "modification" transaction type.

Line 3. 'From' identifies client making request.

Line 4. Blank line identifies separation between data object header and data object body.

Line 5. 'DELETE' removes forwarding for Lookup query of record '123.abc'.

Line 6. 'ADD' enables forwarding to 'medical.cenon.com', for Lookup query of record 'DEF@456'.

Server Response. The following 6 line server response indicates a plausible reply to the previous client query.
 SDTP/0.9 MODIFY MedImages
 Content-Type: application/sdtp; transaction="modification"
 From: medical.cenon.com
 SUCCEEDED DELETE 123.abc
 FAILED ADD DEF@456

Line 1. Server response identifies protocol and acknowledges request for modification of database MedImages.

Line 2. 'Content-Type' identifies a SDTP application; 'trisection' specifies a "modification" transaction type.

Line 3. 'From' identifies client making request.

Line 4. Blank line identifies separation between data object header and data object body.

Line 5. 'SUCCEEDED' indicates that client query 'DELETE' was completed successfully.

Line 6. 'FAILED' indicates that client query 'ADD' was not completed successfully.

Referring to FIG. 1 a simplified DDNS Nodal indexing system is illustrated. If the electrocardiogram analyzer 10 has a unique identifier which, for purposes of this illustration is noted as the number one. When a user first is established with the system of the present invention the user might be subject to electrocardiogram analyzer testing on, for example, Jan. 11th 1998. This date, in combination with unique electrocardiogram analyzer identifier "one" is than registered was in DDNS server 14 and. In this example the DDNS server is noted as a Level-2 server located at the University of Chicago noted with the abbreviation "UCH."

Other electrocardiogram analyzers 12, 16, and 18 are also shown as part of the system. Electrocardiogram analyzer 12 is connected to DDNS server 14. Electrocardiogram analyzer 16 is connected to DDNS server 20 which, in the present example is noted as being associated with Massachusetts general hospital, abbreviated as "MAG.". Electrocardiogram analyzer 18 having the unique identifier "4" is connected to DDNS server 22 in New York City.

DDNS level 2 servers 22, 20, and 14 are connected to a DDNS Level-1 server 24. The purpose of the DDNS Level-1 server 24 is to receive and store a record of the identifiers of individual date or records created by the individual electrocardiogram analyzers shown in FIG. 1. It is important to note that the DDNS Level-1 server 24 does not contain the ultimate information, that is, the results of electrocardiograms that have been administered to the particular patient at the various hospitals. (It should be noted that DDNS level 1 server may actually be serval machines as is later illustrated.) DDNS Level-1 server 24 only contains a record of the indices that show where the information is stored. Thus for example, if a patient receives an electrocardiogram on Jan. 11th 1998 from electrocardiogram analyzer can the information record concerning that analysis is stored and the user is given a medical identification card possessing and ID number associated with at first examination. If that patient is subsequently examined using electrocardiogra analyzer 18 on Sep. 23rd 1998, the practitioner would obtain the medical identification card of the patient, record that information through electrocardiogram analyzer 18 which would then the determine if it had ever seen that particular patient before. If not, a query would proceed from electrocardiogram analyzer 18 to DDNS Level-2 server 22 to inquire if a record of that patient exists. If no such record exists at DDNS Level-2 server 22 that server will send a query to DDNS Level-1 server 24 to determine if it has a record of the particular patient.

DDNS Level-1 server or 24 will have such are record of the existence of the particular patient is existing at electrocardiogram analyzer 10 which can be reached via DDNS server 14. Thereafter DDNS Level-2 22 will make contact with DDNS Level-2 server 14 on behalf of electrocardiogram analyzer 18, with electrocardiogram analyzer 10.

In this example, DDNS servers of two different levels are shown. The level 2 servers store and broker requests for indices relating to medical equipment that is connected to them. The level 1 DDNS servers store and broker requests for indices relating to patients from Level 2 servers connected to them. Thus information is not generally passed when a query is made, only the identification of the location of the data is transferred. It should also be noted that this example of use in the medical arena is not meant to be limiting. As will be explained later, other application areas are equally considered to be within the scope of the present invention.

Figure 2:
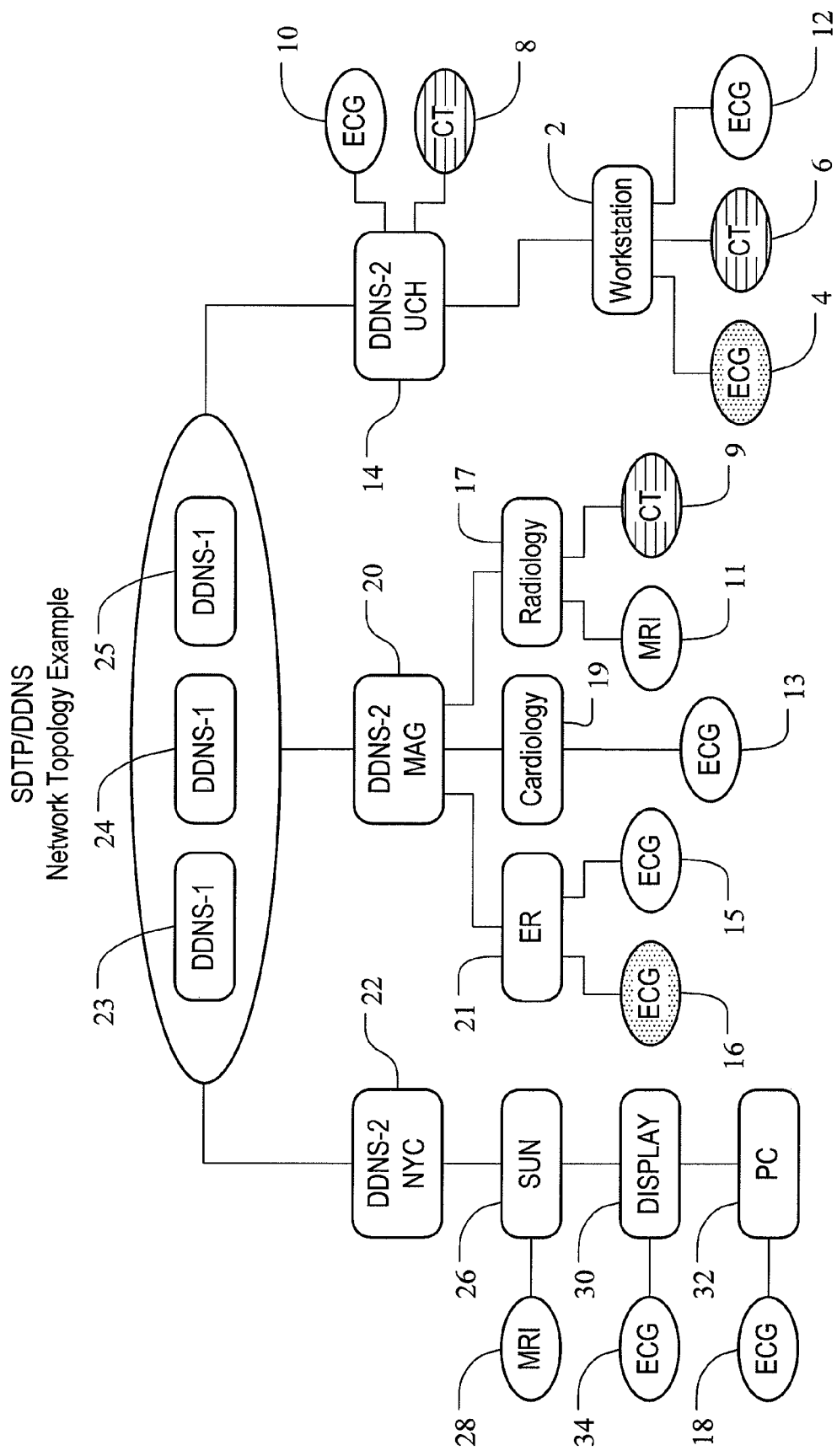
FIG. 2 illustrates a DDNS network topology

Referring to FIG. 2 the network topology of the present invention is illustrated. As noted earlier, the present invention is device driven rather than driven by a top-down classification schemata. A series of medical devices may be attached to a workstation at a particular hospital. For sample, ECG 4, CT 6, and ECG 12 may all be attached to a workstation 2 at a location, for example, the University of Chicago (UCH). ECG 4 will have its own unique identifier generally assigned by the manufacturer. When the ECG 4 is first activated to perform its first examination and creates the appropriate patient record, ECH 4 becomes registered on the system of the present invention. Thus the global identifier for ECG 4 is created the first time the device is activated. In a similar fashion, CT 6 also has a unique identifier as does ECG 12. These devices are also shown as attached to workstation 2.

Alternatively medical devices may be self-contained and amenable to being attached or directly connected to a DDNS server. The situation is also illustrated in FIG. 2 where CT 8 is shown as directly connected to second level DDNS 14. Additionally, ECG 10 is also shown as connected to the DDNS level 2 server 14.

All of the above devices ECG 4, CT 6, ECG 12, CT 8, ECG 10, and workstation 2 are all uniquely identified and registered with the system of the present invention the moment that they are first activated. As will be shown later, a date time stamp is also used in conjunction with the unique identifier to create a unique patient identifier the first time that the patient uses my device that is registered on the system.

In a similar fashion, other medical devices and other geographically disparate locations can also become registered on the system of the present invention. Again referring to FIG. 2 ECG devices 13.15, and 16 may all be resident at, for example, Massachusetts General Hospital (in this figure designated as MAG). Additionally, MRI 11 and CT are also shown as located in Massachusetts General hospital. ECG 15 and 16 may be located in emergency room 21 while ECG 13 may be located in and the attached to a workstation and cardiology 19. MRI 11 and CT 9 may be connected to workstation 17 in radiology. Workstations 21 in the emergency room, 19 in cardiology, and 17 in radiology are all connected to DDNS level 2 server 20. It is important to note that unique identifiers will only be associated with the devices actually performing the diagnostic task, that is, devices 9, 11, 13, 15, and 16. Workstations 17, 19, and 21 will not to have unique identifiers since they will not be creating the medical records to be searched. It is of course possible that an individual hospital may wish to have unique identifiers regarding all devices on a network whether diagnostic or not in order to be able trace all instances of data or information created. The present invention will support this implementation as well.

In FIG. 2 yet a third location, hypothetically a hospital in New York City (designated as NYC) is shown as having a series of medical devices as well. In this is an instance ECG 18 is connected to a PC 32. That PC is in turn connected to a display 30 was capable of displaying the results of the ECG analysis. Similarly, ECG 34 is directly connected to display 30. Display 30 is connected to a workstation 26 which has an MRI device 28 connected to it. This workstation 26 is in turn attached to DDNS level-2 server 22.

All of the DDNS level-2 servers 14, 20, and 22 are connected to DDNS level-1 servers 23, 24, and 25. These DDNS level-1 servers broker queries for information and client index locations coming from the various geographic locations were a patient may be treated.

It is important to note that once a medical device is activated for the first time, its unique ID is stored at both the DDNS level-2 server and a DDNS level-1 server. This is because the DDNS Level-2 server knows about diagnostic devices connected to it and DDNS Level-1 servers know about DDNS Level-2 connected to them. Thus the DDNS servers learn about the diagnostic devices in different ways. Further, once a patient is treated for the first time using any medical device that is attached to the present system, a permanent designation for that patient is created which comprises the unique identifier of the medical device combined with the date time stamp of the first treatment of the patient.

In practice, and as will be discussed in detail later, a patient who is treated at ECG 18 in NYC, and who possesses a medical ID card or barcode label on any card created by the system will cause a query to be created to determine if any other medical records exist for the patient. Initially a query will go as high as DDNS level-2 server 22. If an index to that client's records exists within the New York City location, that information will be sent to the operator of ECG 18. If such information does not exist, DDNS level-2 server 22 will add a new record to its database and will send the query to DDNS level-1 servers 23, 24, and 25 to determine where a patient index for that particular patient does exist. If DDNS Level-1 server knows about the record, it will make a record associating the new data record with the data record that already exists in its database. If the patient was first treated at University of Chicago, the patient index, derived from the medical ID card, will cause a query to be sent to DDNS level-2 server 14 which will respond with the various indices which indicate that location of records relating to the patient of interest.

EXAMPLES

Figure 3:
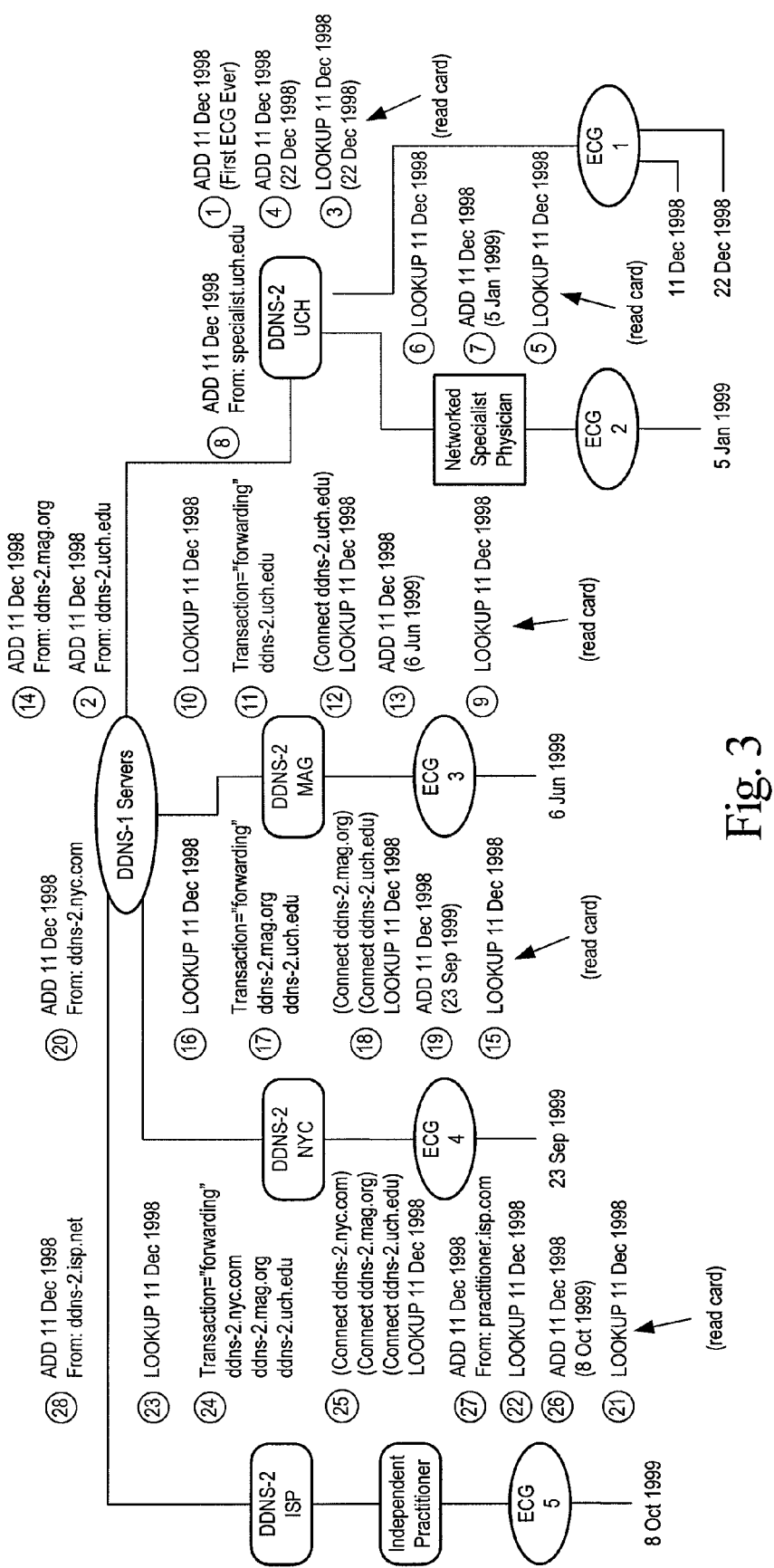
FIG. 3 illustrates a specific example of an instance of use of the DDNS network topology

By way of example and to further illustrate a preferred embodiment of the present invention, FIG. 3 is presented. Since only data regarding indices to information os being searched, the system of the present invention responds very quickly to queries for the location of patient information. In the examples that follow, only the date@device designation is used. In the full implementation the manufacturers ID would also be present as part of the unique identifier.

1. Jane comes the University of Chicago Hospital on 11 Dec. 1998 for the first time, to receive her first ECG ever, where she receives a University of Chicago Hospital medical card as a normal part of her admission. Upon receiving an ECG exam, Jane's reading is automatically entered into the University of Chicago Hospital's local database system, and a printer produces a small sticker which a nurse affixed to Jane's medical card.

SDTP/0.9 MODIFY MedImages
   Content-Type; application/sdtp; transaction="modification"
   From; ddns-2.uch.net
   ADD 19981211@1
   Since DDDS-2:UCH has never seen record '19981211@1', it attempts to 'ADD' it to the next level "up" (to DDNS-1 Servers). A similar SDTP client query is sent "up" to DDNS-1 Servers.

2. DDNS-1 Servers receive and process the following client query request to ADD record '19981211@1' to the global 'MedImages' database:

SDTP/0.9 MODIFY MedImages
   Content-Type; application/sdtp; transaction="modification"
   From: ddns-2.uch.edu
   ADD 19981211@1
   Since DDNS-1 Servers have not yet seen record '19981211@1' DDNS-1 Servers store it. Using the From: field, DDNS-1 Serviers further associate '19981211@1' with address 'ddns-2.uch.edu.' DDNS-1 Servers will now forward future Lookup requests for record '19981211@1' to DDNS-2:UCH.

DDNS-1 Servers return a SDTP server response to DDNS-2:UCH. The response indicates successful completion of the request ADD for '19981211@1' in database 'MedImages.' The server response is:

SDTP/0.9 MODIFY MedImages
   Content-Type: application/sdtp; transaction="modification"
   From: ddns-2 uch.edu
   SUCCEEDED ADD 19981211@1

The DDNS system has now globally registered record '19981211@1' in the universal database 'MedImages'.

Crucial implications follow from this design (a) A local system creates a global identifier in a fully automatic manner without any human intervention whatsoever.

(b) This process requires no form of "root registration" for users of equipment.

(c) A user may operate whatever local system is most desirable, without interference from SDTP/DDNS.

3. Jane returns for a follow-up visit on 22 Dec. 1998. A nurse clicks a barcode reader on Jane's medical card, which concurrently prompts DDNS-2:UCH to do an internal 'Lookup' client query for the number encoded onto her card ('19981211@1') which was encoded during her first visit on 11 Dec. 1998. Since DDNS-2:UCH has the record '19981211@1' it stops searching, and does not query DDNS-1 Servers. Jane's previous reading of 11 Dec. 1998 is automatically recalled onto the screen.

4. The 'ADD' command now saves the 22 Dec. 1998 reading, associating it with the 11 Dec. 1998 reading through the global index (database "key") '19981211@1'. The SDTP interaction looks like:
   SDTP/0.9 MODIFY MedImages
   Convent-Type: application/sdtp; transaction="modification"
   From: ddns-2.uch.edu
   ADD 19981211@1

The attending physician refers Jane to a Networked Specialist Physician, who makes an appointment of 5 Jan. 1999.

Crucial implications follow from the client-server interactions up to now:

(a) DDNS-1 Servers store a mapping from record '19981211@1' to DDNS-2:UCH. DDNS-2UCH has a mapping to whatever internal mechanism the University of Chicago Hospital uses to record its data.

(b) DDNS-1 Servers and DDNS-2:UCH only know about one record C'19981211@1'), while the University of Chicago Hospital knows about two records. A "one-to-many" relationship is created.

Because only 1 number is stored at the DDNS-1 Servers level, global system performance is optimized. Only 1 number provides potential access to all of Jane's records at the University, of Chicago Hospital.

(c) Routine business at the University of Chicago Hospital remains on site. This reduces system complexity on the local side, and further optimizes Level-1 DDNS performance. DDNS uses global resources only when local resources do not have the needed information.

(d) A user participates in global information sharing without any special interaction besides barcode reading a medical card. Currently, optical readers provide the most robust construction, but any other encoding mechanism could be used. Similarly, rather than affixing a label, the medical card be given at the end of the visit, with the universal identifier indelibly marked on the card.

5. On 5 Jan. 1999 Jane arrives for her referral appointment with a Networked Specialist Physician (NSP) made during her last visit to the University of Chicago Hospital on 22 Dec. 1998.

A nurse at the NSP barcode-reads Jane's University of Chicago Hospital medical card to begin the process. The NSP local machine does an internal client query 'Lookup' for the number encoded onto Jane's card ('19981211@1'). This record is not found on the local machine, and so the machine sends a client query to DDNS-2:UCH.
   SDTP/0.9 LOOKUP MedImages 19981211@1

6. DDNS-2:UCH receives the previous client query and does an internal 'Lookup' for '19981211@1', which it finds. Since the search for record '19981211@1' is satisfied, DDNS-2:UCH does not query DDNS-1 Servers. DDNS-2:UCH returns records from 11 Dec. 1998 and 22 Dec. 1998.

Although miles from the University of Chicago Hospital, clicking a barcode reader on Jane's medical card provides the NSP instant retrieval of previous ECG readings at the University of Chicago.

7. Although appearing to the SNP in the same moment, the system now ADDs the reading taken on 5 Jan. 1999 to the NSP local system, associating it with the global index '19981211@1'.

Since record '19981211@1' is stored for the first time on the NSP local machine, the NSP local machine also attempts to ADD "up" record '19981211@1', for global registration in databas 'MedImages'. The NSP local system sends this command to it DDNS server, DDNS-2"UCH:
   SDTP/0.9 MODIFY MedImages
   Convent-Type: application/sdtp; transaction="modification"
   From: specialist.uch.edu
   ADD 19981211@1

8. DDNS-2:UCH receives the previous client query 'ADD'. Since DDNS-2:UCH has already registered record '19981211@1', it now associates the NSP address with record '19981211@1', as an address answering questions about global record '19981211@1'. DDNS-2:UCH returns a server response indicating the successful status of the client query ADD:
   SDTP/0.9 MODIFY MedImages
   Convent-Type: application/sdtp; transaction="modification"
   From: specialist.uch.edu
   ADD 19981211@1

9. On 6 Jun. 1999 Jane visits Massachusetts General Hospital (MAG). A nurse barcode reads Jane's University of Chicago medical card, which posts an internal Lookup client query to DDNS-2:MAG, for the original ECG taken on 11 Dec. 1998 (in Chicago, affixed to Jane's University of Chicago Hospital card).

Not having seen record '19981211@1' before, DDNS-2:MAG asks if DDNS-1 Servers know where to find information about this record. DDNS-2:MAG sends this client query Lookup request to DDNS-1 Servers:
   SDTP/0.9 LOOKUP MedImages 19981211@1

10. DDNS-1 Servers receive DDNS-2:MaG's previous client query Lookup for record '19981211@1' in global database 'MedImages'. DDNS-1 Servers do know about record '19981211@1': that DDNS-2:UCH answers questions about it.

11. DDNS-1 Servers send a server response indicating that DDNS-2:UCH answers queries about record '19981211@1'. The forwarding message sent is:
   SDTP/0.9 LOOKUP MedImages
   Content-Type: application/sdtp; transaction="forwarding"
   ddns-2.uch.edu 12. DDNS-2:MAG directly connects to DDNS-2:UCH, which queries machine specialist.uch.edu, requesting records related to '19981211@1':
   SDTP/0.9 LOOKUP MedImages 19981211@1
   DDNS-2:UCH returns records for ECG readings taken on 5 Jan. 1999, 22 Dec. 1998, and 11 Dec. 1998.

Barcode reading Jane's University of Chicago Hospital medical card in Massachusetts General Hospital instantly retrieves Jane's previous records, displaying the images on the screen within a moment of clicking the barcode reader.

13. Although appearing in the same moment from the nurse's point of view, the system now saves the 6 Jun. 1999 reading to the local Massachusetts General Hospital machine.

Since DDNS-2:MAG does not have the '11 Dec. 1998' reading (globally indexed by '19981211@1'), it adds '19981211@1' to its database, associating it with the new reading taken locally on 6 Jun. 1999. Since '19981211@1' is a new record to DDNS-2:MAG, it also attempts to ADD "up" the record just scanned from Jane's University of Chicago Hospital medical card, '19981211@1'. DDNS-2:MAG sends a client query ADD to DDNS-1 Servers.

SDTP/0.9 MODIFY MedImages
Content-Type: application/sdtp; transaction="modification"
From: ddns-2.mag.org
ADD 19981211@1

14. DDNS-1 Servers receive the previous client query request to ADD record '19981211@1' to global database 'MedImages'. Since DDNS-1 Servers already know about record '19981211@1', DDNS-1 Servers store the address in the From: header (ddns-2.mag.org) as a location that will answer queries for global record '19981211@1'.

Future Lookup requests for record '19981211@1' now will receive forwarding instructions for both DDNS-2:MAG and DDNS-2:UCH. DDNS-1 Servers now sends a server response indicating status of the request:
SDTP/0.9 MODIFY MedImages
Content-Type: application/sdtp; transaction="modification"
From: ddns-2.mag.org
SUCCEEDED ADD 19981211@1

15. Jane is in a car accident in New York City, and is rushed to a random hospital, where an attendant discovers a University of Chicago Hospital medical card in her purse.

Clicking a barcode reader on the card, a DDNS-2:NYC internal Lookup learns that record '19981211@1' is unknown. So it sends a client query Lookup request "up", to DDNS-1 Servers.

16. DDNS-L Servers receive a client query Lookup request from DDNS-2:NYC:
SDTP/0.9 LOOKUP MedImages 19981211@1
DDNS-1 Servers know about record '19981211@1', and have two forwarding address associations: DDNS-2:MAG and DDNS-2:UCH.

17. DDNS-1 Servers know that DDNS-2:UCH and DDNS-2:MAG answer queries for record '19981211@1', and return forwarding instructions for these addresses.
SDTP/0.9 LOOKUP MedImages
Content-Type: application/sdtp; transaction="forwarding"
ddns-2.mag.org
ddns-2.uch.edu 18. DDNS-2:NYC directly connects to DDNS-2:MAG and DDNS-2:UCH, querying for record '19981211@1', using the following client query for both addresses:
SDTP/0.9 LOOKUP MedImages 19981211@1
Four records appear on the screen in the emergency room:
6 Jun. 1999 DDNS-2:MAG
5 Jan. 1999 DDNS-2:UCH
22 Dec. 1998 DDNS-2:UCH
11 Dec. 1998 DDNS-2:UCH While the top-level DDNS service (DDNS-1 Servers) only knows about global record '19981211@1', the New York Hospital emergency room now views four records, from three devices, from two different sites, simply by barcode reading a University of Chicago Hospital medical card.

The physicians need not know from which facilities Jane has records, and yet her comprehensive ECG records are available instantaneously.

19. Although appearing to the emergency room in the same moment, the system now ADDs the reading taken on 23 Sep. 1999 to the local DDNS-2:NYC system, associating it with the global index of '19981211@1'.

Since record '19981211@1' is stored for the first time on the DDNS-2:NYC, DDNS-2:NYC also attempts to ADD "up" record '19981211@1', for global registration in database 'MedImages'.

20. DDNS-1 Servers receives the following client query request to ADD record '19981211@1' to global database 'MedImages', from DDNS-2:NYC.
SDTP/0.9 MODIFY MedImages
Content-Type: application/sdtp; transaction="modification"
From: ddns-2.nyc.com
ADD 19981211@1
Since DDNS-1 Servers already know about record '19981211@1' (from DDNS-2:MAG and DDNS-2:UCH), DDNS-1 Servers add the address in the From: header (ddns-2.nyc.com) to the list of addresses that will answer queries for global record '19981211@1'. DDNS-1 Servers then sends a server response indicating status of DDNS-2:NYC's client query ADD request:
SDTP/0.9 MODIFY MedImages
Content-Type: application/sdtp; transaction="modification"
From: ddns-2.nyc.com
SUCCEEDED ADD 19981211@1
Having made this addition, DDNS-1 Servers will answer future Lookup requests for record '19981211@1' with forwarding instructions to:
DDNS-2:NYC
DDNS-2:MAG
DDNS-2:UCH.

21. While on vacation in the Florida Keys, away from convenient access to a hospital, Jane experiences chest pain. She goes to an Independent Practitioner (IP) on 8 Oct. 1999, and presents her University of Chicago Hospital medical card, which the physician barcode reads.

The physician's local machine does an internal client query 'Lookup' for the number encoded onto Jane's University of Chicago card '19981211@1'). This record is not found on the local machine, and so the local machine sends a client query to DDNS-2:ISP.
SDTP/0.9 LOOKUP MedImages 19981211@1

22. DDNS-2:ISP receives the previous client query Lookup request for record '19981211@1' in global database 'MedImages'. Not having seen record '19981211@1' before, DDNS-2:ISP asks if DDNS-1 Servers know where to find information about record '19981211@1'. DDNS-2:ISP sends this client query Lookup request to DDNS-1 Servers:
SDTP/0.9 LOOKUP MedImages 19981211@1

23. DDNS-1 Servers receive DDNS-2:ISP's previous client query Lookup for record '19981211@1' in global database 'MedImages'. DDNS-1 Servers know that these addresses answer questions about record '19981211@1':
DDNS-2:NYC
DDNS-2:MAG
DDNS-2:UCH.

24. DDNS-1 Servers send a server response indicating forwarding addresses that answer queries about global record '19981211@1'. The forwarding message sent is:
SDTP/0.9 LOOKUP MedImages
Content-Type: application/sdtp; transaction="forwarding"
ddns-2.nyc.com
ddns-2.mag.org
ddns-2.uch.edu 25. DDNS-2:ISP directly connects to DDNS-2:ISP, DDNS-2:MAG, and DDNS2:UCH, querying for record '1998121101', using the following client query for all addresses:
SDTP/0.9 LOOKUP MedImages 19981211@1
Five records appear on the Local Practitioner's screen:
23 Sep. 1999 DDNS-2:NYC
6 Jun. 1999 DDNS-2:MAG
5 Jan. 1999 DDNS-2:UCH
22 Dec. 1998 DDNS-2:UCH
11 Dec. 1998 DDNS-2:UCH These records represent Jane's cumulative ECG patient history beginning on 11 Dec. 1998, globally indexed to record '19981211@1'. Thus, even in a remote area, the Independent Practitioner has instantaneous access to live records, from four devices, from different sites thousands of miles apart, simply by barcode, reading a University of Chicago Hospital medical card.

26. Although appearing approximately in the same moment as the record retrievals, the system now saves the 8 Oct. 1999 reading to the IP's local system.

Since the local system does not have the '11 Dec. 1998' reading (globally indexed by '19981211@1'), it adds '19981211@1' to its database, associating it with the new reading taken locally on 8 Oct. 1999.

Since '19981211@1' is a new record to the IP's local system, the local system also attempts to ADD "up" the record ('19981211@1') just read from Jane's University of Chicago Hospital medical card. The IP's local system sends a client query ADD to DDNS-2:ISP.
SDTP/0.9 MODIFY MedImages
Content-Type: application/sdtp; transaction="modification"
From: practitioner.isp.com
ADD 19981211@1

27. DDNS-2:ISP receives the previous client query request from the Independent Practitioner's machine to ADD record '19981211@1' to global database 'MedImages'.

Since DDNS-2:ISP does not know about record '19981211@1' it stores it locally, associating it with the address in the From: header as an address that answers queries or global record '19981211@1'. DDNS-2:ISP will know in the future to query address practitioner.isp.com for records related to global record '19981211@1'. DDNS-2:ISP returns a server response indicating status of the client query from the Independent practitioner machine.
SDTP/0.9 MODIFY MedImages
Content-Type: application/sdtp; transaction="modification"
From: practitioner.isp.com
SUCCEEDED ADD 19981211@1
Since record '19981211@1' is new to DDNS-2:ISP, it also passes the client query ADD "up" to DDNS-1 Servers. DDNS-2:ISP sends the following client query ADD request to DDNS-1 Servers;
SDTP/0.9 MODIFY MedImages
Content-Type: application/sdtp; transaction="modification"
From: ddns-2.isp.net
ADD 19981211@1

28. DDNS-1 Servers receive the previous client query request to ADD record '19981211@1' to global database 'MedImages',from ddns-2.isp.net.

Since DDNS-1 Servers already know about record '19981211@1' (from DDNS-2:NYC, DDNS-2:MAG and DDNS-2:UCH), DDNS-1 Servers store the address in the From:header ('ddns-2. isp.net), associating it with the other addresses that answer queries for global record '19981211@1'.

DDNS-1 Servers return a server response indicating the status of the previous client query ADD request from DDNS-2:ISP.
SDTP/0.9 MODIFY MedImages
Content-Type: application/sdtp; transaction="modification"
From: ddns-2.isp.net
SUCCEEDED ADD 19981211@1
Now future Lookup requests for global record '19981211@1' will receive forwarding instructions for:
DDNS-2:ISP
DDNS-2:NYC
DDNS-2:MAG
DDNS-2:UCH.

Of course, each address answers queries using its own network architecture, storage procedures, and database policies. SDTP/DDNS provides uniform access to the ECGs stored at these addresses.

This example illustrates the flexibility and generality of DDNS service for large, distributed collections of data. In this paradigm, data can reside on different machines and machines that do not know about one another, unlike much traditional design for large database systems. Databases need not be explicitly linked.

Similarly, in this paradigm, data exists as query relations, dynamically organizing and relating information at moments of request. Yet record recall is efficient, even across the Internet, providing approximately instantaneous response time.

For clarity and ease of illustration, this example illustrates a "two-level" hierarchy of machines. However, SDTP/DDNS databases can be arbitrarily deep rather than two layers deep. At any moment, new servers can be added at any level in the hierarchy, providing each organization with maximal opportunity to optimize its own performance, and to administer its own policies.

The DDNS system is driven by manipulation of names, by design permitting easy portability of machines within any organization. In this respect a namespace becomes a global variable to which a machine or machines become attached. Thus, for example, ddns-2.nyc.com could be a single machine, or a pointer to other machines; and/or the New York Hospital could change the type of machine supporting the ddns-2.nyc.com namespace without interrupting service to its local or global community.

The present invention comprises software on computers and firmware in certain of the medical diagnostic devices. The devices of the present invention comprise those medical diagnostic devices known in the art which have the ability to store and output information. The DDNS servers of the present invention comprise hardware and software and local storage for storing information comprising indices relating to uses of devices on the network. Any of a variety of IBM PC and compatibles are suitable to the task of the workstations attached to the medical diagnostic equipment or as DDNS-Level-2 servers. All that is required is that there be sufficient storage to store the indices noted. The DDNS level-1 servers can also be IBM PC, Sun workstations or indeed any server capable of storing and retrieving information and communicating that information via modems or otherwise to other servers or workstations of the present invention. Thus the software giving rise to the unique identifiers is stored at the lower levels of the system while software for storing, retrieving and associated indices are typically located at the high levels servers of the system.

Further Examples

On a home computer, Jane clicks a barcode on the last grocery receipt, which reproduces the same order as the week before. Arriving at the grocery store, the order has been charged to her credit card, and is waiting for pick up.

On a home computer John clicks a barcode reader on an old pair of athletic shoes. A web page appears on which he is offered a choice to repurchase the same shoes (same brand, size, color, etc.), from the same company. He mouse-clicks on "Accept" and the same credit card is charged that originally purchased the shoes. The shoes are delivered to his house the next day. One barcode click and one mouse click consummate this interaction.

A student goes to a book store needing several chapters of various books. He selects a book of interest from the shelves, and using the bookstore's PC "kiosk", clicks on Chapter 3. A web-page returns instantly, indicating that he may purchase this chapter for $1.83, for which he may use his credit card or pay the cashier.

Unknown to the consumer, at the moment of clicking the barcode reader, the publisher has been consulted and the publisher's royalties and bookstore's profit margins have been combined in the $1.83 purchase. Each month the publisher sends automatically generated invoices to bookstores that itemize royalties due. Such a mechanism works just as easily for images in publications, and journal articles, etc., and in libraries and photocopy shops to enhance copyright protection.

A car owner brings a car to a garage for a muffler repair. Clicking a barcode reader, the mechanic learns that the muffler is in warranty. The mechanic provides better service to the car owner, and receives automatic part restocking from the manufacturer.

The manufacturer not only automatically tracks muffler repairs for a given model, but also the precise plants from which the failed mufflers come. The manufacturer has an automatic way to track part life-cycles manufacturing defects, repair warranties, replacement policies, etc. Yet such data gathering is accomplished in the process of normal automotive repair.

On site, a furnace repairman clicks a barcode reader at a broken furnace part, a cellular phone calls into a local service provider, which in turn recalls the repair history of the furnace, and the part availability for repair. New parts can be ordered from the portable decoder the repairman brings to on-site jobs.

The repair process is streamlined, permitting the repairman to order parts order directly from the manufacturer, while on-site, through an on-site cellular connection to a local service provider, by passing administrative overhead back at the home office.

Many other such examples apply, such automatic tracing of insurance records by an insurance company; repurchases of home appliances, wood, paints. The entire process is universally and automatically indexed at production or transaction time, supported by this document's "device-based" approach to universal database construction.

A system and method for establishing and retrieving data based on global indices has been described. As previously noted, although a medical application has been described, it will be appreciated by those skilled in the art from reviewing the specification and the examples given that many other embodiments are possible using the system with departing from the scope of the invention as disclosed.

We claim:

1. A method for indexing data in a network based on unique identifiers, the method comprising:

establishing a unique location identifier for each of a plurality of data generating devices on the network, the unique location identifier for identifying a network location of each of the plurality of data generating devices in the network;

registering the unique location identifier of each of the plurality of data generating devices on at least one server connected to the network when each respective one of the data generating devices is first used on the network;

establishing a unique identifier for data generated by the plurality of data generating devices;

registering the unique identifier for data generated by the plurality of data generating devices on the at least one server, wherein registering the unique identifier further comprises the at least one server associating the unique identifier with a first unique location identifier of a data generating device;

the at least one server associating the unique identifier with a second unique location identifier of the data generating device in response to a change in a location of the data generating device;

providing a plurality of servers in a tree structure, the at least one server included in the tree structure;

receiving a query from a client machine at one of the servers, wherein the query is for the data generated by the plurality of data generating devices and the query is based on the unique identifier;

the one of the servers, in response to the query received from the client machine, querying at least one parent server of the one of the servers until the second unique location identifier associated with the unique identifier is found, the at least one parent server included in the servers;

transmitting the second unique location identifier to the client machine in response to the query received at the one of the servers; and the data generating device transmitting data generated by the data generating device to the client machine directly over a peer-to-peer connection established in response to transmitting the second unique location identifier to the client machine.

2. The method of claim 1 further comprising storing the unique identifier on a token.

3. The method of claim 2 further comprising using the token for subsequent uses of any of the plurality of data generating devices.

4. The method of claim 1 further comprising retrieving data generated by one of the plurality of data generating devices by manipulating the unique identifier associated with that data.

5. The method of claim 4, wherein the unique identifier is transmitted to the at least one server.

6. A method for storing data based on a plurality of unique identifiers and a plurality of unique location identifiers maintained in at least one server in a network, the network including a plurality of data generating devices, the method comprising:

registering the unique location identifiers on the at least one server when the data generating devices are first used on the network, wherein each one of the unique location identifiers identifies a location of a corresponding one of the data generating devices on the network;

generating a unique data identifier at a respective one of the plurality of data generating devices for data generated at the respective one of the plurality of data generating devices when the data is created;

the at least one server storing an association of the unique data identifier and the unique location identifiers of each of the plurality of data generating devices that generated the data identified by the unique data identifier;

the at least one server changing an association of a unique identifier and a first unique location identifier of a data generating device to an association of the unique identifier and a second unique location identifier of the data generating device in response to changing a network location of the data generating device;

providing a plurality of servers in a tree structure, the at least one server included in the servers;

receiving a query from a client machine at one of the servers, wherein the query is for data generated by the data generating device and the query is based on the unique identifier;

the one of the servers, in response to the query received from the client machine, sending a request to at least one parent server of the one of the servers until the unique identifier is found, the at least one parent server included in the servers;

transmitting the second unique location identifier to the client machine in response to the query received at the one of the servers; and the data generating device transmitting data generated by the data generating device to the client machine directly over a peer-to-peer connection created in response to transmitting the second unique location identifier to the client machine.

7. The method of claim 6, wherein the plurality of data generating devices comprise client entities.

8. The method of claim 6, further comprising adding new data to the network by creating a new association of another unique data identifier to a unique location identifier of an appropriate one of the plurality of data generating devices.

9. The method of claim 6, further comprising removing data from the network by deleting the association of the unique data identifier and the second unique location identifier.

10. The method of claim 6, further comprising updating data in the network by modifying an association of the unique data identifier and the second unique location identifier.

11. A computer readable medium containing computer executable code for indexing data in a network based on unique identifiers, the computer executable code comprising instructions for:

receiving a unique identifier generated by a data generating devices in response to the data generating device first generating data on the network;

registering the unique identifier for the data generated by the data generating device, wherein registering the unique identifier further comprises associating the unique identifier with a unique location identifier, and the unique location identifier identifies a location of the data generating device in the network;

associating the unique identifier with a second unique location identifier of the data generating device in response to changing the location of the data generating device;

one of a plurality of servers receiving a query from a client machine, wherein the query is for the data generated by the data generating device;

the one of the servers querying, in response to the query received from the client machine, at least one parent server of the one of the servers to find the second unique location identifier, the at least one parent server included in the servers, and the servers arranged in a tree structure;

transmitting the second unique location identifier to the client machine after receiving a response to the query sent to the at least one parent server; and transmitting the data generated by the data generating device from the data generating device to the client machine over a connection created between the data generation device and the client machine after transmitting the second unique location identifier to the client machine.

12. The computer readable medium of claim 11, further comprising instructions for automatically detecting and integrating spontaneously added data generating devices at the at least one server.

* * * * *